United States Patent
Romano

(10) Patent No.: US 7,084,693 B2
(45) Date of Patent: Aug. 1, 2006

(54) SUB-HARMONIC MIXER

(75) Inventor: Antonio Romano, Ashton (CA)

(73) Assignee: Dragonwave, Inc., Kanata (CA)

( * ) Notice: Subject to any disclaimer, the term of this patent is extended or adjusted under 35 U.S.C. 154(b) by 447 days.

(21) Appl. No.: 10/720,124

(22) Filed: Nov. 25, 2003

(65) Prior Publication Data

US 2004/0106391 A1 Jun. 3, 2004

Related U.S. Application Data

(60) Provisional application No. 60/428,685, filed on Nov. 25, 2002.

(51) Int. Cl.
*G06F 7/44* (2006.01)
*G06F 7/16* (2006.01)

(52) U.S. Cl. .................... 327/355; 327/356

(58) Field of Classification Search ............... None
See application file for complete search history.

(56) References Cited

U.S. PATENT DOCUMENTS

| | | | | |
|---|---|---|---|---|
| 5,448,197 A | * | 9/1995 | Sagawa et al. | 327/408 |
| 5,789,963 A | * | 8/1998 | Sakusabe | 327/356 |
| 6,057,714 A | * | 5/2000 | Andrys et al. | 327/105 |
| 6,861,891 B1 | * | 3/2005 | Romano | 327/355 |

* cited by examiner

*Primary Examiner*—Tuan T. Lam

(57) ABSTRACT

A sub-harmonic mixer comprises two field effect transistors (FETs) in which the drains are coupled together. The mixer includes a signal generator for generating two local oscillator signals in antiphase with each other and which is arranged to feed one local oscillator signal to the source of one of the FETs and the other local oscillator signal to the source of the other FET. An input and output port is coupled to the drains for receiving input signals for the mixer and outputting output signals from the mixer.

15 Claims, 3 Drawing Sheets

SUB-HARMONIC MIXER

CROSS REFERENCE TO RELATED APPLICATIONS

This application is a Non-Provisional application claiming priority from U.S. Provisional Application No. 60/428,685 filed Nov. 25, 2002.

FIELD OF THE INVENTION

The present invention relates to mixers for wireless receivers and transmitters, and in particular to sub-harmonic mixers.

BACKGROUND OF THE INVENTION

Receiver circuits for millimeter wave wireless communication systems typically include a low noise amplifier (LNA) and a down-converter for converting the received, high frequency signal to a lower, intermediate frequency (IF) signal, from which the baseband signal is subsequently extracted. Monolithic microwave integrated circuit (MMIC) fabrication technology enables the low noise amplifier and down-converter mixer circuits to be formed on a single integrated circuit chip, in order to improve performance, simplify production and reduce costs. For relatively low microwave carrier frequencies, the down-converter may employ a fundamental mixer, in which the same frequency generated by the local oscillator (LO) is mixed with the received RF signal to generate the intermediate frequency components. At low microwave frequencies, the local oscillator frequency is normally well separated from the RF frequency so that the LO signal can be readily isolated from the RF mixer port using standard filtering techniques. However, at higher microwave frequencies, the frequency of the local oscillator signal becomes geometrically closer to the RF carrier frequency in order to down-convert the RF frequency to a suitable intermediate frequency. This proximity of the local oscillator frequency to the RF frequency can lead to undesirable LO frequency radiation, and also isolation problems between the RF and LO mixer ports. Another drawback of using fundamental mixers in microwave frequency applications is that the local oscillators required to provide adequate output power at millimeter wave frequencies tend to be relatively bulky and expensive.

An alternative form of mixer which is employed in microwave frequency receivers is the sub-harmonic mixer, in which the injected mixer frequency which is mixed with the RF frequency is a multiple of the LO frequency generated by the local oscillator. This arrangement provides better frequency separation between the local oscillator and RF frequencies, thereby making it easier to prevent LO frequency signals leaking into the RF port and to prevent RF frequency signals passing to the LO port. However, a particular disadvantage of known sub-harmonic mixers is that they have a greater conversion loss in comparison to fundamental mixers.

SUMMARY OF THE INVENTION

According to one aspect of the present invention, there is provided a mixer, comprising: first and second field effect transistors, each having a gate, a source and a drain, the drains being connected together, signal generating means for generating first and second local oscillator signals substantially in anti-phase with each other, the signal generating means being arranged to feed the first local oscillator signal to the source of the first field effect transistor and the second local oscillator signal to the source of the second field effect transistor, input means coupled to the drains for receiving an input signal for the mixer, and output means coupled to the drains for outputting an output signal from the mixer.

Advantageously, it has been found that this arrangement allows the input impedance of the mixer at the sources of the FETs to be substantially lower than that of conventional, gate-driven FET sub-harmonic mixers, thereby allowing better impedance matching and improved LO signal coupling at the LO ports, and the use of lower LO signal power. Furthermore, in simulated tests, the inventor has found that, suprisingly, this arrangement may provide a sub-harmonic mixer having a significantly lower conversion loss than other sub-harmonic mixers.

In one embodiment, the sub-harmonic mixer further comprises input signal coupling means for coupling the source of each of the first and second field effect transistors to ground at the frequency of the input signal.

In one embodiment, the sub-harmonic mixer further comprises input signal coupling means for coupling the source of each of the first and second field effect transistors to ground at the frequency of the output signal.

In one embodiment, the sub-harmonic mixer further comprises DC coupling means for coupling the source of each of the first and second transistors to DC ground.

In one embodiment, the sub-harmonic mixer further includes LO coupling means for coupling the gate of each of the first and second field effect transistors to ground at the frequency of the local oscillator signal.

In one embodiment, the sub-harmonic mixer comprises biasing means for biasing the gate of each of the first and second field effect transistors at a bias voltage such that the first and second field effect transistors operate in pinch-off mode.

Embodiments of the sub-harmonic mixer may further comprise filter means for substantially preventing signals having frequencies of any of the local oscillator signal, the input signal and the output signal, passing from a respective gate to the biasing means, and in one embodiment, the filter means may comprise a choke, a resistor, or any other means, including a device or circuit, that substantially isolates the dc bias from ac signals at the mixer.

A sub-harmonic mixer according to embodiments of the present invention may further comprise DC coupling means for coupling the drains of each of the first and second field effect transistors to DC ground.

Embodiments of the sub-harmonic mixer may further comprise filter means connected to the drains for selectively passing signals of a particular frequency or frequencies. In one embodiment, the filter means may include an RF filter for selectively passing desired RF frequencies which may either be received by the mixer as an input signal or generated by the mixer as an output signal.

In embodiments of the present invention, the filter means may be adapted to pass signals having a frequency selected from $f_{RF}=2nf_0 \pm f_{IF}$, where $f_{IF}$ is an intermediate frequency signal at the drains of the mixer (either as an input signal to the mixer as an output signal from the mixer), $f_0$ is the local oscillator frequency, and n is a selected integer.

In one embodiment, the filter means may be adapted for passing an RF frequency or frequencies within a first frequency band which is above the frequency of the local oscillator signal, $f_0$.

In embodiments of the sub-harmonic mixer, the filter means may include a filter for passing signals having a selected intermediate frequency or frequencies (or a baseband signal), which may either be received by the mixer as an input signal or generated by the mixer as an output signal.

The filter may be adapted to pass a frequency selected from $f_{IF}=f_{RF}-2nf_0$ or $2nf_0-f_{RF}$, where $f_{RF}$ is the frequency of the RF signal input to the drains of the mixer, $f_0$ is the frequency of the local oscillator signal, and n is a selected integer. In one embodiment, the filter may be adapted to pass signals having a selected frequency or frequencies below the frequency of the local oscillator signal, $f_0$.

In embodiments of the mixer, the signal generating means comprises a local oscillator for generating a local oscillator signal and a signal splitter for dividing the signal into the first and second local oscillator signals.

According to another aspect of the present invention, there is provided a mixer, comprising: first and second field effect transistors, each having a gate, a source and a drain, the sources being connected together, signal generating means for generating first and second local oscillator signals substantially in anti-phase with each other, said signal generating means being arranged to feed said first local oscillator signal to the drain of the first field effect transistor and the second local oscillator signal to the drain of the second field effect transistor, a first port coupled to said sources for receiving an input signal for the mixer and a second port coupled to said sources for outputting an output signal from the mixer.

BRIEF DESCRIPTION OF THE DRAWINGS

Preferred embodiments of the invention will now be described with reference to the attached drawings in which.

DETAILED DESCRIPTION OF EMBODIMENTS

Figure 1:
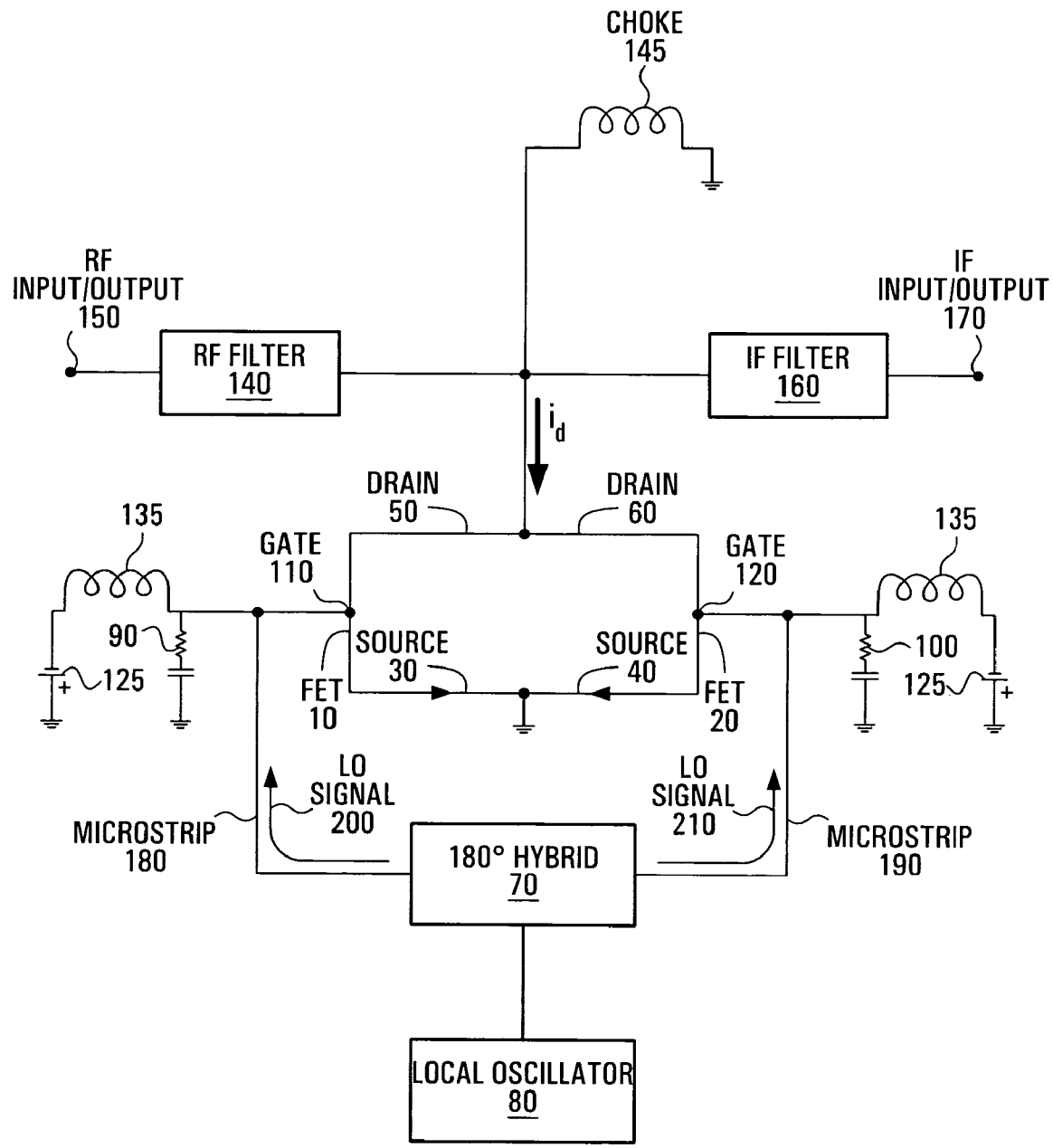
FIG. 1 is a circuit diagram of a conventional gate-driven sub-harmonic mixer.

Referring to FIG. 1, shown is a circuit diagram of a conventional gate-driven sub-harmonic mixer. A first FET (Field Effect Transistor) 10 and a second FET 20 each have a respective source 30, 40, a respective drain 50, 60 and a respective gate 110, 120. The drains 50, 60 are connected together, and the sources 30, 40 are connected together, and also to ground. A 180° hybrid 70 is connected to the gates 110, 120 of the FETs 10, 20, through a respective conducting microstrip 180, 190, and a local oscillator 80 is connected to the 180° hybrid 70. An ac grounded resistor 90, 100 is also connected to a respective gate 110, 120 of the FETs 10, 20. A choke 145 connects the drains 50, 60 of the FETs 10, 20 to DC ground. An RF filter 140 is connected between an RF input/output 150 and the drains 50, 60, and an IF (intermediate frequency) filter 160 is connected between an IF input/output 170 and the drains 50, 60.

A signal of frequency, $f_0$, is generated by the local oscillator 80 and split by the 180° hybrid 70 into two LO (Local Oscillator) signals 200, 210 that have a phase difference of approximately 180°, and each of the signals is applied to a respective gate 110, 120. The gate voltages applied by the LO signals modulate the source-drain resistances of the FETs 10, 20, and the 180° phase difference between the LO signals enables conduction through the combined FETs 10, 20 for both positive and negative portions of cycles of the signal generated by the local oscillator 80.

More specifically, the gates 110, 120, of the FETs 10, 20 are dc biased by a dc voltage source 125 through choke coils 135, to operate in "pinch-off", where the source-drain resistance is high. In pinch-off, the source-drain current at a respective one of the drains 50, 60 of the FETS, 10, 20 is approximately proportional to the source-drain voltage, $V_{DS}$, across respective sources 30, 40 and drains 50, 60, and approximately proportional to the gate-source voltages, $V_{GS}$, across respective gates 110, 120 and sources 30, 40. In pinch-off, by applying gate-source voltages, $V_{GS}$, of frequency, $f_0$, to the FETs 10, 20, the source-drain resistance of each FET 10, 20 is modulated with frequency, $f_0$. However, since the gate voltage of one of the FETs 10, 20 is approximately 180° out of phase with the gate voltage of the other FET 10, 20, the gate-source voltages, $V_{GS}$, applied to the FETs 10, 20 are also approximately 180° out of phase with each other, and this results in the effective resistance or conductance of the combined FETs 10, 20 being modulated with a frequency $2f_0$. If the conduction characteristics of both FETS are the same, time varying conduction at the fundamental frequency LO and odd harmonics are suppressed or rejected so that the dominant mixer frequency is $2f_0$. In this case, the mixer operates as a sub-harmonic mixer, generating sum and difference frequencies of $f_{out}=2f_0 \pm f_{IN}$. In contrast, a fundamental mixer generates sum and difference frequencies of $f_{out}=f_0 \pm f_{IN}$.

In the case where an RF signal of frequency, $f_{RF}$, is input at the RF input/output 150, the RF signal drives a source-drain voltage, $V_{DS}$, of frequency, $f_{RF}$, across the sources 30, 40 and drains 50, 60 of the FETs 10, 20. The effective source-drain resistance of the combined FETs 10, 20 being modulated with frequency, $2f_0$, and the source-drain voltage, $V_{DS}$, having a frequency, $f_{RF}$, result in a current, $i_d$, at the drains 50, 60 of the FETs 10, 20 having frequency components with frequencies, $2f_0 \pm f_{RF}$ or $f_{RF} \pm 2f_0$.

The IF filter 160 is adapted to pass an IF signal having the frequency component $f_{RF}-2f_0$ and/or $2f_0-f_{RF}$ (depending on side band operation) to the IF input/output 170, while rejecting RF and LO frequencies, as well as other unwanted frequency components generated by the mixing process.

In the case where an IF signal, of frequency $f_{IF}$, is input at the IF input/output 170, the IF signal drives a source-drain voltage, $V_{DS}$, of frequency, $f_{IF}$, across the sources 30, 40 and drains 50, 60 of the FETs 10, 20. The effective source-drain resistance of the combined FETs 10, 20 being modulated with frequency, $2f_0$, and the source-drain voltage, $V_{DS}$, having a frequency, $f_{IF}$, result in a current, $i_d$, at the drains 50, 60 of the FETs 10, 20 having frequency components with frequencies, $2f_0 \pm f_{IF}$. The RF filter 140 is adapted to pass an RF signal having the selected frequency component to the RF input/output 150, while rejecting IF and LO frequencies as well as other unwanted frequency components generated by the mixing process.

The impedance of the conducting microstrips 180, 190 is typically 50 Ω whereas the gate impedance of the FETs 10, 20 is typically much greater. The resistors 90, 100 are used to lower the gate impedance of the FETs 10, 20 to a value which allows an acceptable impedance match over the required LO bandwidth. The resistors 90, 100 reduce the mismatch in impedance between the conducting microstrips 180, 190 and the gates 110, 120 of the FETs 10, 20 but nonetheless reduce the applied voltage at the gates 110, 120 of the FETs 10, 20, and therefore a high LO signal power is required to compensate and to drive the gates 110, 120 at the desired ac voltage.

Figure 2:
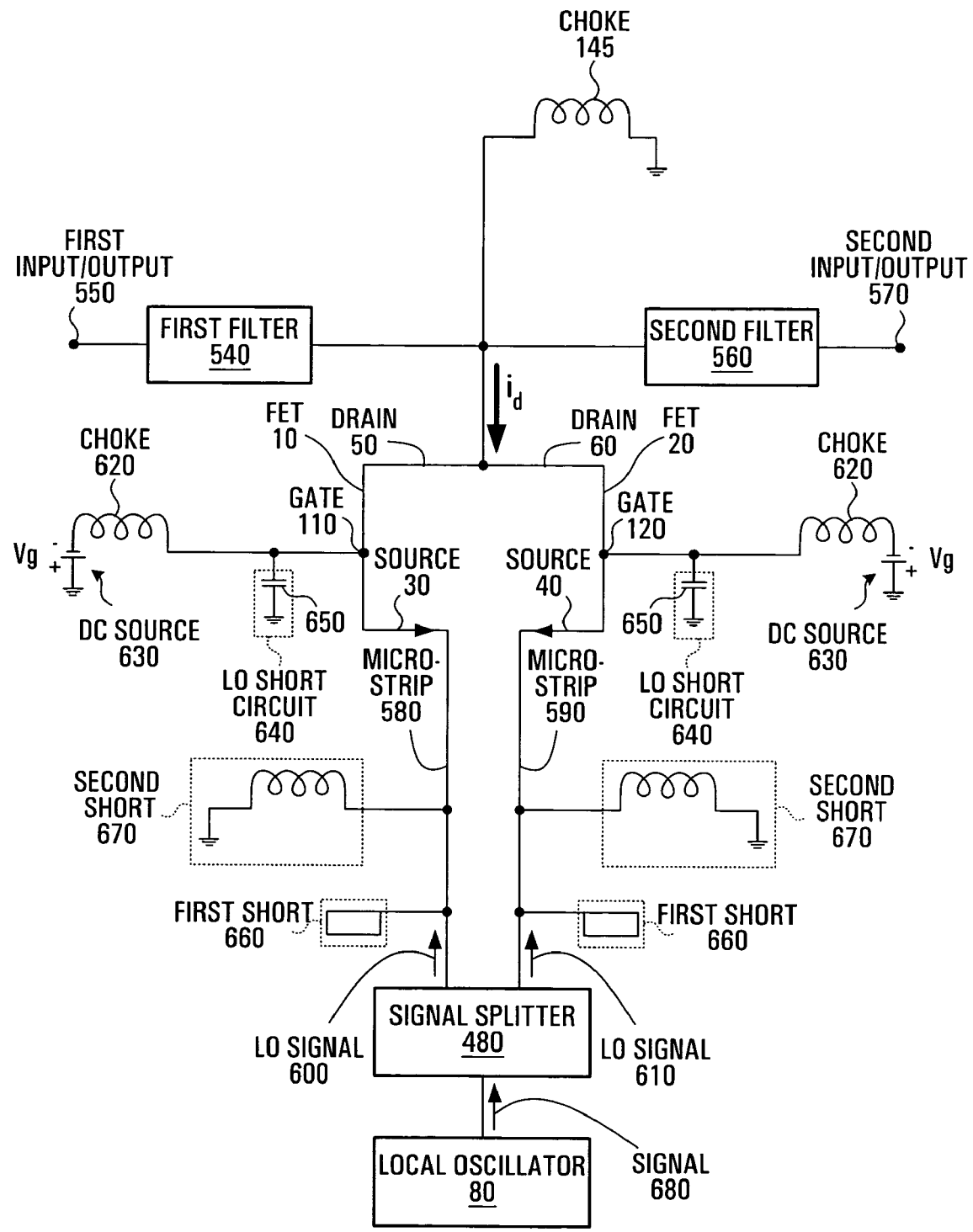
FIG. 2 is a circuit diagram of a sub-harmonic mixer, according to an embodiment of the invention.

Referring FIG. 2, shown is a circuit diagram of a sub-harmonic mixer, according to an embodiment of the invention. The mixer comprises first and second FETS 10, 20 each having a source 30, 40, a drain 50, 60, and a gate 110, 120. A local oscillator 80 is connected to a signal splitter 480. The signal splitter 480 may comprise any suitable device such as, for example, a 180° hybrid or a balun, capable of splitting a signal from the local oscillator into two LO signals having a phase difference of approximately 180° and preferably of equal magnitude. The signal splitter 480 is connected, through conducting microstrips 580, 590, to respective ones of the sources 30, 40 of the two FETs 10, 20. The drains 50, 60 of the FETs 10, 20 are connected together, and a choke 145 is provided to connect the drains 50, 60 to DC ground. A first filter 540 is connected between the drains 50, 60 and a first mixer input/output 550, and a second filter 560 is connected between the drains 50, 60 and a second mixer input/output 570. A DC source 630 is connected to each gate 110, 120 to provide a DC bias thereto, via a choke 620. An LO short 640 for shorting LO frequency signals to ground is connected to each of the gates 110, 120 of the FETs 10, 20. In this embodiment the LO shorts 640 are implemented as capacitors 650 connected to ground. In other embodiments of the invention, the LO shorts 640 may comprise any suitable device capable of providing a short-circuit to ground for signals at LO frequencies. RF and IF shorts 660, 670 are connected to each one of the conducting microstrips 580, 590. The RF short 660 is adapted to provide a short to ground for a signal at the desired RF frequency and in this embodiment comprises a quarter wavelength (λ/4) stubb. The IF short 670 is adapted to provide a short to ground for a signal at the desired intermediate frequency, and in this embodiment comprises a choke coil coupled to ground, although in other embodiments the IF short may comprise a stubb of suitable length, or any other suitable device.

The sub-harmonic mixer of FIG. 2 is adapted to convert an input signal having an input frequency, $f_{in}$, to an output signal having an output frequency, $f_{out}$, which is different from $f_{in}$. The input signal is input at one of the input/outputs 550, 570 and the output signal is output at the other one of the input/outputs 550, 570. As such when one of the input/outputs 550, 570 serves as an input for the input signal the other one of the input/outputs 550, 570 serves as an output for the output signal. Two cases are discussed below. In the first case, the input signal is an RF signal of frequency $f_{RF}=f_{in}$ and the output signal is an IF signal of frequency $f_{IF}=f_{out}$. In the second case, the input signal is an IF signal of frequency $f_{IF}=f_{in}$ and the output signal is an RF signal of frequency $f_{RF}=f_{out}$. However, embodiments of the invention are not limited to these two cases and other signals may be used.

A signal 680 of frequency, $f_0$, generated by the local oscillator 80 is fed to the signal splitter 480 where the signal is split into two LO signals 600, 610 of frequency, $f_0$, and having a phase difference of approximately 180°. The LO signals 600, 610 each propagate through a respective conducting microstrip 580, 590 and provide respective source voltages, $V_{SS}$, at the sources 30, 40 of the FETs 10, 20. The source voltages have a frequency, $f_0$, and are approximately 180° out of phase with each other. The LO shorts 640 each provide a short to ground for a respective LO signal, resulting in respective gate-source voltages across the gates 110, 120 and sources 30, 40 of the FETs 10, 20. The LO shorts 640 effectively reduce the LO input impedance (i.e. source impedance) of the FETs 10, 20, respectively, by reducing the gate-source impedance component of the source impedance, which comprises the parallel combination of gate-source and source-drain impedances.

The first and second shorts 660, 670 coupled to the sources 30, 40 of the FETs provide short-circuits to ground for any signal of frequency, $f_{in}$ or $f_{out}$. For example, when one of the input and output signals is an RF signal and the other is an IF signal, the first short 660 and the second short 670 each provide a short to ground for any signal at the desired RF and IF frequencies, respectively.

The chokes 620 which are connected to the DC source 630 serve to isolate the dc source from ac frequencies at the mixer and, in one embodiment, provide a large impedance at frequencies $f_{in}$ and $f_{out}$ at the gates of the FETs 10, 20 to prevent signal leakage at these frequencies to the DC source and to ground. The chokes 620 may also provide a large impedance at LO frequencies to prevent any signal at LO frequencies from passing to the DC source(s) 630. In other embodiments, isolation between the mixer and dc source may be realised by any other means, for example by resistance means.

The RF and IF shorts 660, 670 coupled to the sources 30, 40 of the FETS 10, 20 (together with the gate chokes 620), are provided to ensure that most, and preferably all, of the RF and IF signal voltages are dropped across the drain-source of the FETS.

The gate-source voltages of the FETs 10, 20 are approximately (or exactly) 180° out of phase with each other and have a frequency, $f_0$. The DC sources 630 may provide respective DC gate voltages, $V_g$, having a value such that the FETs 10, 20 operate in "pinch-off". The gate-source voltages modulate the source-drain resistance of each FET 10, 20 with frequency, $f_0$, and since the gate-source voltages are approximately 180° out of phase with each other, the source-drain modulated resistances are also approximately 180° out of phase with each other. Thus, with the drains 50, 60 of the FETs 10, 20 being connected together, the combined FETs 10, 20 provide an effective source-drain resistance modulated at frequency, $2f_0$, and allow conduction for both positive and negative portions of cycles of the signal 680 generated by the local oscillator 80.

In the case when the input signal is an RF signal of frequency, $f_{in}=f_{RF}$, the input signal may be input at the first input/output 550. The input signal applies a source-drain voltage, $V_{DS}$, having a frequency, $f_{in}=f_{RF}$, across the sources 30, 40 and drains 50, 60 of the FETs 10, 20. With the effective source-drain resistance of the combined FETs 10, 20 being modulated with frequency, $2f_0$, and the source-drain voltage, $V_{DS}$, having a frequency, $f_{in}=f_{RF}$, the current, $i_d$, at the drains 50, 60 of the FETs 10, 20 includes frequency components of frequencies, $f_{RF}\pm 2f_0$ or $2f_0\pm f_{RF}$.

Preferably, the conduction characteristics of the FETs are the same so that the conduction curve of the FET combination is symmetric for both positive and negative cycles of the LO signal, and modulation at the fundamental frequency $f_0$ and higher odd harmonics are suppressed or rejected as much as possible so that the lowest and most dominant modulation frequency is $2f_0$. The frequency component, $f_{RF}-2f_0$ or $2f_0-f_{RF}$, of current $i_d$ may constitute the selected IF frequency to be output from the mixer. The second filter 560 passes this frequency component to the second input/output port 570 while rejecting other frequency components. In other embodiments, the second filter 560 may be used to pass any one or more of the frequency components generated by the mixer.

In the case when the input signal is an IF signal of frequency, $f_{in}=f_{IF}$, the input signal may be input at the second input/output 570. The input signal applies a source-drain voltage, $V_{DS}$, having a frequency, $f_{in}=f_{IF}$, across the sources 30, 40 and drains 50, 60 of the FETs 10, 20. With the effective source-drain resistance of the combined FETs 10, 20 being modulated with frequency, $2f_0$, and the source-drain voltage, $V_{DS}$, having a frequency, $f_{IF}$, the current, $i_d$, at the drains 50, 60 of the FETs 10, 20 includes frequency components of frequencies, $2f_0 \pm f_{IF}$. The frequency component of current $i_d$ having a frequency of $2f_0+f_{IF}$ or $2f_0-f_{IF}$ may constitute the selected RF frequency to be output from the mixer. The first filter 540 passes the frequency component of frequency $f_{RF}=f_{IF}+2f_0$ to the first input/output port 550, while rejecting other frequency components. In other embodiments the first filter 540 may be used to pass any one or more of the frequency components generated by the mixer.

In a FET, the source-drain resistance is smaller than the gate-source resistance or the gate-drain resistance. Consequently, the impedance at the sources 30, 40 of the FETs 10, 20 in the embodiment of FIG. 2 is lower than the impedance at the gates 110, 120 of the FETs 10, 20 of FIG. 1. As such, impedances at the sources 30, 40 of the FETs 10, 20 in the embodiment of FIG. 2 are better matched to the impedance of the microstrips 580, 590, and the mixer does not need a lossy matching network which is required by the conventional gate-driven sub-harmonic mixer of FIG. 1. Advantageously this arrangement allows the LO port to be impedance matched over a broader bandwidth. Surprisingly, it has been found in simulated tests that the sub-harmonic mixer of FIG. 2 has a conversion loss of approximately 7.5 dB whereas the conventional gate-driven sub-harmonic mixer of FIG. 1 has a conversion loss of approximately 10 to 13 dB. Thus the sub-harmonic mixer of FIG. 2 may provide a dramatic improvement in conversion loss when compared to the conventional gate-driven sub-harmonic mixer of FIG. 1.

Figure 3:
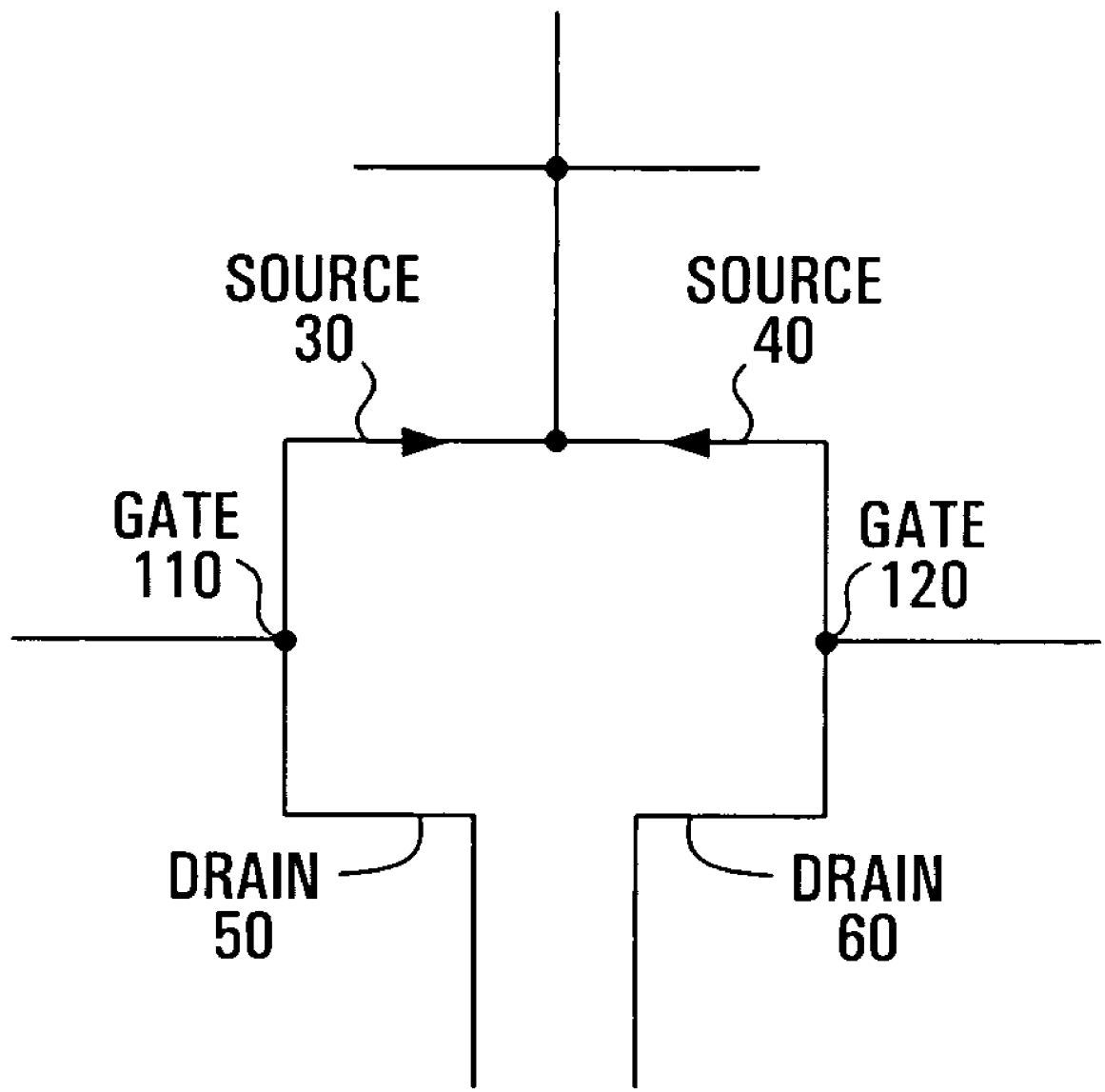
FIG. 3 shows another arrangement of FET's for use in embodiments of the invention.

In other embodiments of the invention, the drains 50, 60 of the FETs 10, 20 are connected to the conducting microstrips 580, 590 and the sources 30, 40 of the FETs 10, 20 are connected to each other. An example of such an embodiment may comprise the circuit arrangement of FIG. 2 except that in the illustration, the sources 30 and 40 would be interchanged with the drains 50 and 60, respectively, as for example shown in FIG. 3.

Embodiments of the sub-harmonic mixer may be adapted to down-convert RF signals either directly into the baseband signal, or indirectly into an intermediate frequency signal. Similarly, embodiments of the sub-harmonic mixer, may be adapted to up-convert either a baseband signal directly to the desired RF carrier frequency, or to up-convert an intermediate frequency signal to the desired RF carrier frequency.

In embodiments of the invention, the impedance between the gates of the FETS and ground for LO frequency signals is preferably small or negligible, and more preferably as close to zero as possible, so that as much of the LO signal is dropped across the gate-source of each FET as possible.

Embodiments of the mixer may comprise any suitable FETs, including MESFET's (Metal Semiconductor Field Effect Transistor) and HEMT's (High Electron Mobility Transistors), which may include MESFET's fabricated on heterojunction materials and may be fabricated using MMIC techniques.

In another embodiment of the sub-harmonic mixer, the mixer may have a single, bi-directional input/output port for both receiving an input signal for the mixer and outputting an output signal from the mixer, resulting from mixing between the input and LO signals (e.g. a diplexer implementation). A filter may be coupled between the mixer and the input/output port which is adapted to pass both the input and output signals.

Numerous modifications and variations of embodiments of the present invention are possible in light of the above teachings. It is therefore to be understood that within the scope of the appended claims, embodiments of the invention may be practiced otherwise than as specifically described herein.

The invention claimed is:

1. A sub-harmonic mixer, comprising:
   first and second field effect transistors, each having a gate, a source and a drain, the drains being coupled together,
   signal generating means for generating first and second local oscillator signals substantially in anti-phase with each other, said signal generating means being arranged to feed said first local oscillator signal to the source of said first field effect transistor and the second local oscillator signal to the source of said second field effect transistor,
   an input means coupled to said drains for receiving an input signal for the mixer, and
   an output means coupled to said drains for outputting an output signal from the mixer.

2. A sub-harmonic mixer as claimed in claim 1, further comprising input signal coupling means for coupling the source of each of said first and second field effect transistors to ground at the frequency of the input signal.

3. A sub-harmonic mixer as claimed in claim 1, further comprising output signal coupling means for coupling the source of each of said first and second field effect transistors to ground at the frequency of the output signal.

4. A sub-harmonic mixer as claimed in claim 1, further comprising DC coupling means for coupling the source of each of said first and second transistors to DC ground.

5. A sub-harmonic mixer as claimed in claim 1, further comprising LO coupling means for coupling the gate of each of said first and second field effect transistors to ground at the frequency of said local oscillator signals.

6. A sub-harmonic mixer as claimed in claim 1, further comprising biasing means for biasing the gate of each of said first and second field effect transistors at a bias voltage such that each of said first and second field effect transistors operate in pinch-off mode.

7. A sub-harmonic mixer as claimed in claim 6, further comprising gate signal filter means for substantially preventing signals having frequencies of any of the said local oscillator signals, said input signal and said output signal passing from a respective gate to said biasing means.

8. A sub-harmonic mixer as claimed in claim 7, wherein said gate signal filter means comprises a choke.

9. A sub-harmonic mixer as claimed in claim 1, further comprising DC coupling means for coupling the drains of each of said first and second field effect transistors to DC ground.

10. A sub-harmonic mixer as claimed in claim 9, further comprising filter means for substantially preventing said input signal and said output signal passing through said DC coupling means.

11. A sub-harmonic mixer as claimed in claim 1, further comprising RF filter means connected to said drains for passing signals having frequencies within a first frequency band above the frequency of said local oscillator signals.

12. A sub-harmonic mixer as claimed in claim 1, further comprising a filter connected to the drains for passing frequencies within a frequency band below the frequency of said local oscillator signals.

13. A sub-harmonic mixer as claimed in claim 1, wherein said signal generating means comprises a local oscillator for generating a local oscillator signal and a signal splitter for dividing said signal into said first and second local oscillator signals.

14. A sub-harmonic as claimed in claim 13, wherein said signal splitter comprises one of a hybrid and a balun.

15. A sub-harmonic mixer, comprising:
first and second field effect transistors, each having a gate, a source and a drain, the sources being connected together,
signal generating means for generating first and second local oscillator signals substantially in anti-phase with each other, said signal generating means being arranged to feed said first local oscillator signal to the drain of the first field effect transistor and the second local oscillator signal to the drain of the second field effect transistor,
input means coupled to said sources for receiving an input signal for the mixer, and output means coupled to said sources for outputting an output signal from the mixer.

* * * * *